Jan. 16, 1923.

A. SIMENSZKY.
SAFETY HATPIN.
FILED MAY 13, 1922.

1,442,497

Inventor
Andrew Simenszky.

By
Zoltan Polachek
Attorney

Patented Jan. 16, 1923.

1,442,497

UNITED STATES PATENT OFFICE.

ANDREW SIMENSZKY, OF YUKON, WEST VIRGINIA.

SAFETY HATPIN.

Application filed May 13, 1922. Serial No. 560,544.

*To all whom it may concern:*

Be it known that I, ANDREW SIMENSZKY, a citizen of Hungary, residing at Yukon, in the county of McDowell and State of West Virginia, have invented certain new and useful Improvements in Safety Hatpins, of which the following is a specification.

This invention relates generally to hatpins such as are used in securing women's hats in place, the invention having particular reference to a holder for retaining the hat-pin against displacement.

The invention has for an object to provide a novel holder adapted to grip the pointed end of the pin, which holder is preferably of ornamental design similar to the head of the pin, and which also serves to cover the point of the pin.

For further comprehension of the invention, and of the objects and advantages thereof, reference will be had to the following description and accompanying drawings, and to the appended claims in which the various novel features of the invention are more particularly set forth.

Fig. 1 of the drawings is a side view of a hat-pin having one form of my improved holder attached thereto.

Figure 1:
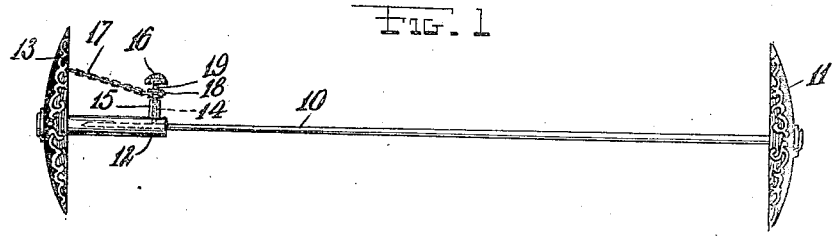

Referring now to Fig. 1 the reference numeral 10 indicates the shank of an ordinary hat-pin having an ornamental head 11. In this embodiment of the invention my improved holder comprises a tubular socket element 12 into which the point of the pin projects, this socket element having formed on its rear, or closed, end a head 13 similar to the head 11 of the pin.

To bind the pin in the socket element 12 I provide a set screw 14 threaded through a hollow boss 15 formed on the said socket element and bearing against the pin, this screw having a head 16 for turning purposes. To obviate chance of the screw being lost it is connected by a chain 17 to the head 13, this chain having a ring 18 on one end which engages freely a grooved collar 19 fixed on the screw 14, the opposite end of the chain being attached to the head 13 in any desired manner.

Figure 2:
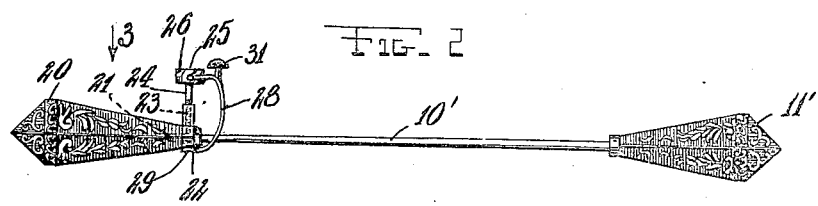
Fig. 2 is a similar view, but showing a modification.
Figure 3:
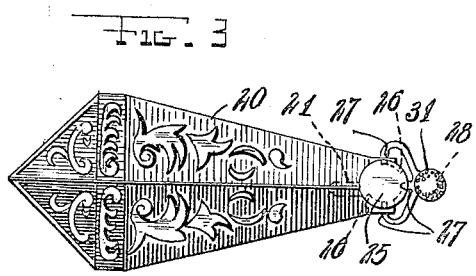
Fig. 3 is an enlarged side view of the holder shown in Fig. 2, this view looking in the direction of the arrow 3 on Fig. 2.
Figure 4:
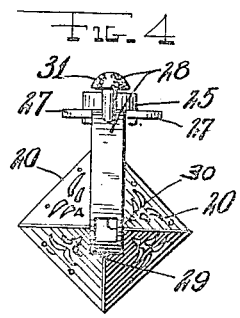
Fig. 4 is an end view of the holder shown in Fig. 3.

In the form of the invention shown in Figs. 2, 3 and 4 the shank of a hat-pin is indicated at 10', and the ornamental head thereof at 11'. The holder comprises a socket-head 20 similar to the head 11', and having a boring 21 extending inward for a distance from its forward end and forming a socket to receive the pin point. Projecting laterally from an integral neck 22 on the forward end of the head 20 is a boss 23 through which is threaded a screw 24 adapted to bear on the pin 10'.

This screw is formed with a short head 25 of cylindrical shape having a number of spiral grooves or slots 26 formed in its circumferential wall, these grooves having the same general direction as the threads of the screw 24 but being of very high pitch. Projecting into these grooves 26 are the ends of a number of studs 27 formed on one end of a bow-spring 28 fixed at its opposite end as at 29 to the neck 22, on the side thereof opposite to that from which the boss 23 projects. This spring 28 has an aperture 30 therein through which the pin 10' is adapted to project, this aperture being slightly elongated in the length of the spring. Fixed on spring 28, adjacent the end thereof on which are the studs 27, is a knob or handle 31.

The manner of use of my improved holder is as follows: Normally the parts are so arranged that the studs 27 rest in the outer ends of the grooves 26, while the aperture 30 in the spring 28 is positioned in accurate registry with the boring 21 in the socket-head. When the holder is to be applied to the pin the knob 31 is pressed inwardly, by which is meant toward the axis of boring 21, which movement causes the screw 24 to be partly rotated, in a loosening direction, by reason of the engagement of the studs 27 in the grooves 26. This movement of the spring 28, causes a shifting of the slot 30 therein, so that one end thereof frictionally engages the pin 10' when the latter is engaged in the boring 21. The knob 31 is then released, and the studs 27 move outward in the grooves 26 and partly rotate the screw 24, causing it to bind on the pin 10' and thus retain the holder thereon. The holder, as will be apparent, is withdrawn from the pin by first pressing the knob 31 to loosen the screw 24.

Having thus described my invention what I claim as new and desire to protect by Letters Patent of the United States is as follows:

1. A hat-pin holder comprising a socket element, a screw threaded into said socket element, and a bow-spring attached at one end to said socket element and engaging said screw at its opposite end to turn said screw in a loosening direction when compressed.

2. A hat-pin holder comprising a socket element, a screw threaded into said socket element, and a bow-spring attached at one end to said socket element and engaging said screw at its opposite end to turn said screw in a loosening direction when compressed, said bow-spring having a number of studs projecting therefrom and engaging in helical grooves in the screw.

3. A hat-pin holder comprising a socket element, a screw threaded into said socket element a head of cylindrical form on said screw and having a number of helical grooves therein, and a bow-spring fixed at one end to said socket element, and studs projecting from the opposite end of the bow-spring into the said grooves and adapted to rotate the screw in opposite directions as the bow-spring is compressed and released.

4. A hat-pin holder comprising a socket element, a screw threaded into said socket element, a head of cylindrical form on said screw and having a number of helical grooves therein, and a bow-spring fixed at one end to said socket element, and studs projecting from the opposite end of the bow-spring into the said grooves and adapted to rotate the screw in opposite directions as the bow-spring is compressed and released, said bow-spring having an aperture therein through which the pin passes, one end wall of said aperture being adapted to bear frictionally on the pin being inserted in the socket element when the said bow-spring is compressed.

In testimony whereof I have affixed my signature.

ANDREW SIMENSZKY.